(12) United States Patent
Matsuo

(10) Patent No.: US 8,240,568 B2
(45) Date of Patent: *Aug. 14, 2012

(54) INFORMATION COMMUNICATION SYSTEM, INFORMATION COMMUNICATION DEVICE, INFORMATION COMMUNICATION METHOD AND COMPUTER PROGRAM

(75) Inventor: Takashi Matsuo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/067,744

(22) Filed: Jun. 23, 2011

(65) Prior Publication Data

US 2011/0253781 A1 Oct. 20, 2011

Related U.S. Application Data

(63) Continuation of application No. 11/647,406, filed on Dec. 29, 2006, now Pat. No. 7,980,469.

(30) Foreign Application Priority Data

Jan. 6, 2006 (JP) .................................. 2006-001107

(51) Int. Cl.
*G06K 7/00* (2006.01)
(52) U.S. Cl. ......................... 235/451; 235/492; 235/380
(58) Field of Classification Search .................. 235/451, 235/492, 494
See application file for complete search history.

(56) References Cited

U.S. PATENT DOCUMENTS

| | | | |
|---|---|---|---|
| 6,564,995 B1 | 5/2003 | Montgomery | |
| 6,735,627 B2 | 5/2004 | Urien | |
| 6,880,084 B1 | 4/2005 | Brittenham et al. | |
| 7,587,756 B2 | 9/2009 | Peart et al. | |
| 2002/0029254 A1 | 3/2002 | Davis et al. | |
| 2004/0164142 A1 | 8/2004 | Flugge et al. | |
| 2004/0215769 A1 | 10/2004 | Yoshida et al. | |
| 2004/0215964 A1 | 10/2004 | Barlow et al. | |
| 2006/0145818 A1 | 7/2006 | Kusakabe et al. | |

FOREIGN PATENT DOCUMENTS

DE 199 29 049 A1 12/2000

(Continued)

OTHER PUBLICATIONS

European Search Report dated Jul. 4, 2007 issued in EP Application No. 07100142.4.
Japanese Office Action issued Sep. 15, 2009 for corresponding Japanese Application No. 2006-001107.
Japanese Office Action issued Jun. 8, 2010 for corresponding Japanese Application No. 2006-001107.
Japanese Office Action issued Feb. 8, 2011 for corresponding Japanese Application No. 2006-001107.

*Primary Examiner* — Thien M. Le
*Assistant Examiner* — Christle Marshall
(74) *Attorney, Agent, or Firm* — Rader Fishman & Grauer, PLLC

(57) ABSTRACT

Information communication includes communicating with an information storage medium having a data communication function determined by a physical communication layer. The information storage medium is accessed by determining the physical communication layer of the information storage medium, from among a plurality of potential physical communication layers. Service data describing attribute information for at least one stored application service is read from the information storage medium, attribute information regarding a desired one of the application services is acquired to confirm that the desired one of the application services is stored on the information storage medium.

5 Claims, 10 Drawing Sheets

FOREIGN PATENT DOCUMENTS

| | | |
|---|---|---|
| EP | 1 271 428 A2 | 1/2003 |
| EP | 1 517 277 A2 | 3/2005 |
| JP | 10-013312 | 1/1998 |
| JP | 2000-112719 A | 4/2000 |
| JP | 2000-276560 A | 10/2000 |
| JP | 2004-287987 A | 10/2004 |
| JP | 2005-136476 A | 5/2005 |
| JP | 2005-182128 A | 7/2005 |
| JP | 2005-196409 | 7/2005 |
| JP | 2005-346611 A | 12/2005 |

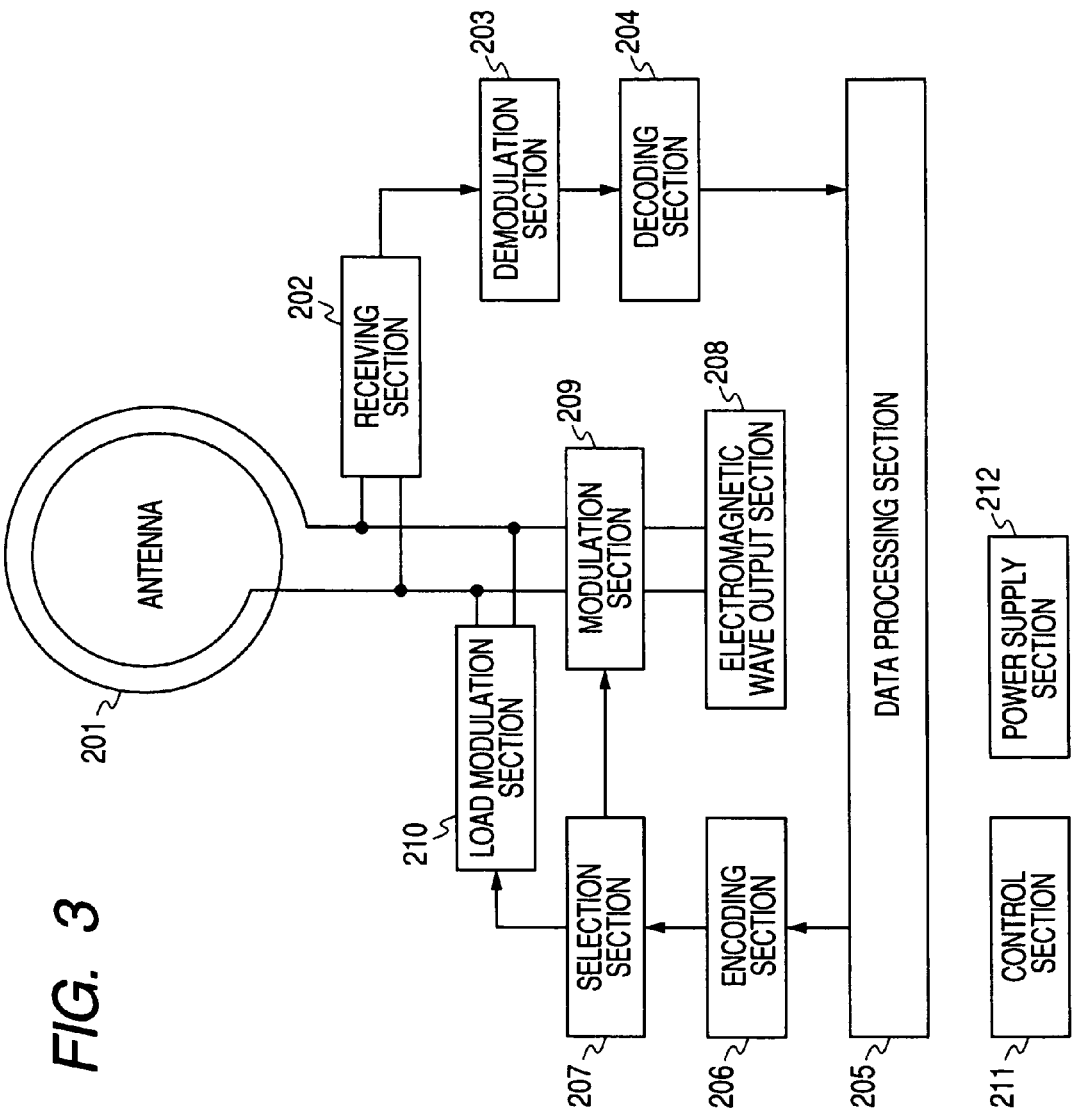

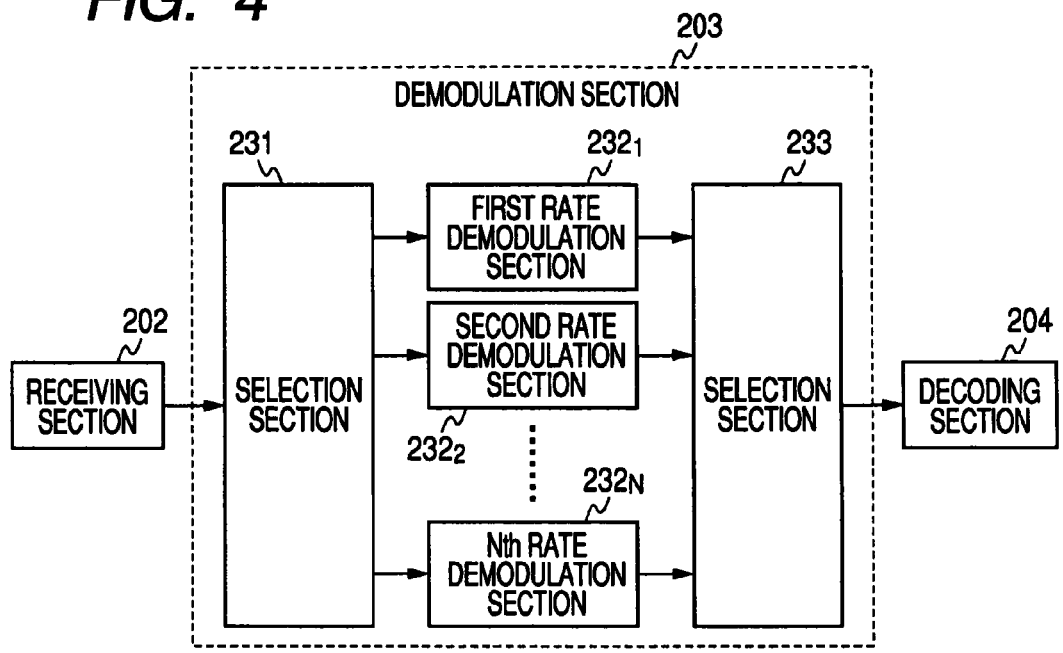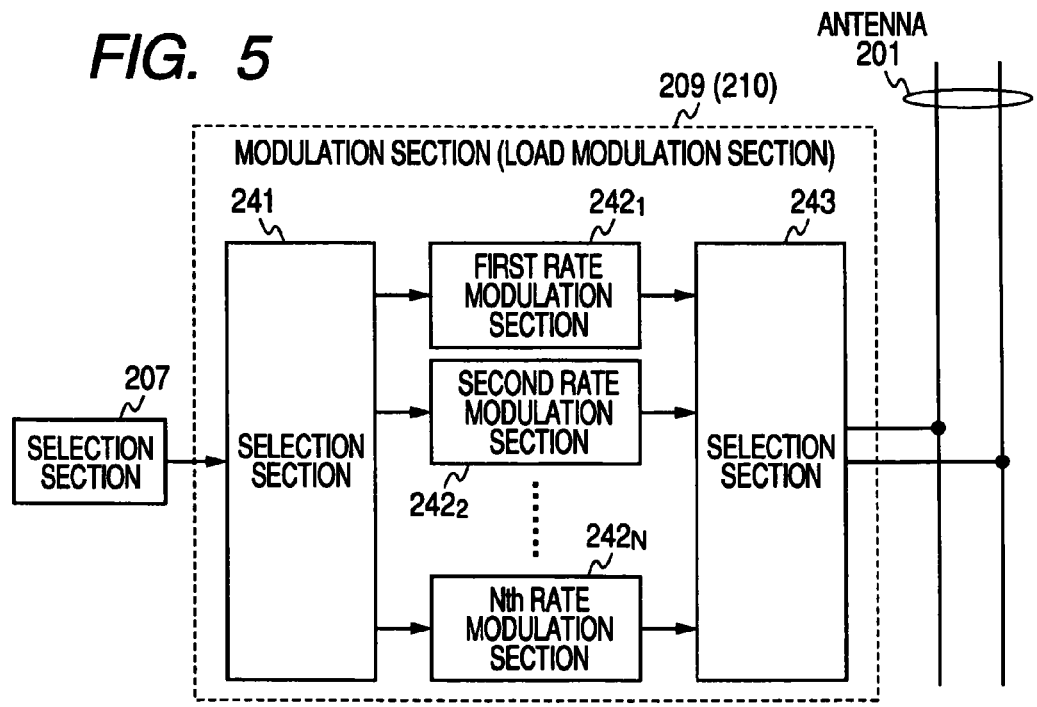

*FIG. 6*

```
<Service>
    <type>e-money</type>
    <name>Edy</name>
    <technology>FeliCa</technology>
</Service>
<Service>
    <type>ticketing</type>
    <name>e-plus</name>
    <technology>FeliCa</technology>
</Service>
```

INFORMATION COMMUNICATION SYSTEM, INFORMATION COMMUNICATION DEVICE, INFORMATION COMMUNICATION METHOD AND COMPUTER PROGRAM

CROSS REFERENCES TO RELATED APPLICATIONS

This is a Continuation of application Ser. No. 11/647,406, filed Dec. 29, 2006, which claims priority to Japanese Patent Application JP 2006-001107 filed in the Japan Patent Office on Jan. 6, 2006, the entire contents of which are incorporated herein by reference.

BACKGROUND OF THE INVENTION

1. Field of the Invention

The present invention relates to an information communication system, an information communication device, an information communication method, and a computer program for performing data communication with a device provided with a data communication function, such as an IC card, and particularly to an information communication system, an information communication device, an information communication method, and a computer program for performing data communication with a device provided with a plurality of data communication functions having technical standards different from each other.

2. Related Art

A contactless proximity communication system typified by an integrated circuit (IC) card has been widely popularized because of its simplicity and convenience. In the proximity communication system applying the IC card, by putting the IC card close to a radio frequency (RF) field (magnetic field) caused by an electromagnetic wave generated by a card read/write device, the IC card is driven with power obtained by electromagnetic induction so as to be allowed to communicate data with the card read/write device (see, for example, JP-A-10-13312). The proximity communication denotes the communication, which is made possible when the distance between the devices to communicate with each other becomes shorter than several tens of centimeters, and includes the communication performed by bringing the housings of the devices into contact with each other.

According to a typical usage of an IC card, the user can use the IC card by holding it above the card read/write device. The card read/write device is always polling the IC card, and a communication operation between both sides is started when it detects an external IC card. For example, by storing a private code or other personal authentication information, or value information such as an electronic ticket in the IC card, an authentication process of visitors or passengers can be performed at a cash dispenser, a gate of a concert venue, or a ticket wicket of a station. According to the IC card technology, the IC card is difficult to copy or tamper with the stored information, namely, it is provided with tamper-resistance, and the proximity communication can realize a high level of security.

It is possible to configure an IC chip provided with the contactless IC card function with a single chip including an RF analog front-end and a logic circuit (protocol control, RF modem, command processing, encryption processing, and memory management), or with two or more IC chips separately including these circuits. In the present specification, these are simply denoted as an IC card in some cases as a collective term.

Further, in accordance with enhancement of the miniaturization technology, an IC card with a relatively large-capacity memory has appeared. According to the IC card with a large-capacity memory, it is possible to develop a file system on the memory space to store a plurality of applications at the same time. For example, by previously storing a plurality of applications such as electronic money for performing electronic payment or an electronic ticket for getting admittance to a specific concert venue on one IC card, it becomes possible to make the one IC card to be applied to various usages. It should be noted that the electronic money and the electronic ticket mentioned here denote a mechanism, which performs payment (electronic payment) through electronic data issued according to a fund provided by the user, or the electronic data itself.

Although IC cards have been spreading rapidly and widely, there has been provided various sorts of different IC card interface standards by card vender companies, which produce and distribute IC cards or card read/write devices. Therefore, a problem of mixing a plurality of interface standards arises. For example, as presently practiced IC card system standards, those called a type A or a type B can be cited.

It should be noted here that in the type A, a data transfer rate of 106 kbps is used, a data encoding method of Miller is applied to the data transfer from the card read/write device to the IC card, and a data encoding method of Manchester is applied to the data transfer from the IC card to the card read/write device, respectively. The type A is adopted by, for example, a Mifare system of Royal Philips Electronics in Netherlands. Further, in the type B, a data transfer rate of 106 kbps is used, a data encoding method of NRZ is applied to the data transfer from the card read/write device to the IC card, and a data encoding method of NRZ-L is applied to the data transfer from the IC card to the card read/write device, respectively. Still further, in a contactless IC card system "FeliCa" (Registered Trademark) of Sony Corporation, a data transfer rate of 212 kbps is used, and the data transfer between the IC card and the card read/write device is performed with the data encoding method of Manchester.

In these times, a short range wireless communication technology having compatibility with a plurality of contactless IC card interfaces with different physical layers has also appeared. For example, the near field communication (NFC) is a short range wireless communication technology jointly developed by Sony Corporation and Royal Philips Electronics in Netherlands, which uses the same frequency band of 13.56 MHz as contactless IC cards, and has compatibility in the physical layer of the communication with both the contactless IC card system "FeliCa" (Registered Trademark) proposed by Sony Corporation and the system "Mifare" (Registered Trademark), which is proposed by Philips, and which is becoming popularized in Europe and the United States. A card read/write device equipped with a transmitter/receiver compatible with the NFC can exchange data with "Suica" (Registered Trademark) of East Japan Railway Company and prepaid electronic money "Edy" (Registered Trademark) of bitWallet adopting the FeliCa system. In accordance with the increase in the number of users of Suica or Edy, an increase in the need for cellular phones capable of confirming the balance of the card or personal computers capable of paying for merchandises purchased through the Internet with Edy can be expected. The NFC is approved as an international standard "ISO/IEC 18092."

Further, an IC card is hitherto issued independently for every business entity, which is a service providing source, and the user is required to prepare the IC card for every service the user wants to use and to bring the IC card therewith. On the contrary, according to an IC card having a relatively large capacity of memory space, it becomes possible to prepare a sufficient amount of capacity for recording information relating to a plurality of services in a built-in memory of a single IC card (see, for example, "The A to Z of IC Tags, Sesame Tip Changes Business" (pp. 106-107, edited by RFID Technology editorial desk, published on Apr. 20, 2004 by Nikkei Business Publications, Inc.)).

By assigning a file system for a certain service providing source business entity in a built-in memory of an IC card to manage the information (e.g., identification or authentication information of the user, remaining value information, or usage history (logs)) for the operation of the service offered by the business entity in the file system, an advantageous service based on contactless and proximity communication capable of replacing the prepaid card or the service card for every outlet in the related art can be realized.

Although the whole of the memory area in the IC card is managed by the issuer of the IC card in the initial state, the service providing source business entity other than the issuer of the IC card divides the memory area to create a new file system to be assigned to an application for operating each service. Division of the file system corresponds to issuance of a virtual IC card. By repeating the dividing operation, the memory area in the IC card becomes to have a structure including a plurality of coexisting file systems, and it becomes possible to provide multiple applications, namely a wide variety of application services with a single IC card (see, for example, JP-A-2005-196409).

According to the increase in the memory size of the IC card, a plurality of application services can be implemented in one IC card. Accordingly, the card read/write device (or an apparatus implementing the read/write device) is required to support a plurality of application services. The card read/write device having compatibility with a plurality of physical layers by utilizing the NFC technology described above, which allows the coexistence of a plurality of types of contactless IC cards, is assumed to be required to support all of the application services provided by respective physical layers.

In general, each of the application services has a data structure unique to every service business entity, and the data structure often remains unpublicized from the viewpoint of security. Therefore, a new problem arises that it is difficult for the card read/write device compatible with the NFC to start data transaction even if it can identify the physical layer of the IC card detected by itself, and it is required to recognize the application services implemented in the IC card.

Although the data management method is different among the application services, it can also be configured so that an application in the side of the card read/write device detects the data structure of each of the technical standards.

For example, in the case in which the application service implemented in the IC card is FeliCa, which one of the type A, the type B of the contactless IC card compliant to the ISO/IEC 14443, or FeliCa is the card can be identified by a polling command having a mechanism for collision avoidance. It should be noted here that the application service can be identified by further referring to the system code and the service code at the stage in which it is turned out to be FeliCa. Further, even in another case than the case with FeliCa, there is a mechanism for similarly judging the application service in the IC card. For example, in the case with Mifare in which data of the Mifare application directory (MAD) exists, the application service can be judged by referring to the data.

However, if it is configured so that the application in the side of the card read/write device recognizes the data structure of each of the standards each time as described above, the software might be bloated.

Further, although a method in which the user having the IC card therewith designates the application to the card read/write device when using the card can also be considered, it requires the user to confirm the type of the application service of the IC card owned by the user, which is troublesome for the user. Further, apart from a cellular phone capable of displaying information, in the case of a typical card type, the user is required to memorize which one of the technical standards the card belongs to, which is not user-friendly.

SUMMARY OF THE INVENTION

Accordingly, it is desirable to provide a superior information communication system, information communication device, information communication method, and computer program capable of preferably communicating data with a device provided with a data communication function, such as an IC card.

It is also desirable to provide a superior information communication system, information communication device, information communication method, and computer program capable of preferably communicating data with a device provided with a plurality of data communication functions having technical standards different from each other.

It is also desirable to provide a superior information processing device, information processing method, and computer program capable of utilizing application services with various data structures stored in an IC card in an environment in which contactless IC cards of a plurality of standards different in the physical layers of communication from each other coexist.

According to one embodiment described herein, information communication includes communicating with an information storage medium having a data communication function determined by a physical communication layer. The information storage medium is accessed by determining the physical communication layer of the information storage medium, from among a plurality of potential physical communication layers. Service data describing attribute information for at least one stored application service is read from the information storage medium, attribute information regarding a desired one of the application services is acquired to confirm that the desired one of the application services is stored on the information storage medium.

According to another embodiment described herein, there is provided an information communication system including an information storage medium provided with a data communication function, and an information communication device for accessing the information storage medium, wherein the information storage medium is capable of storing one or more of the application services, and stores service directory data describing attribute information for each of the stored application services, and the information communication device reads the service directory data from the detected information storage medium, acquires the attribute information regarding a desired one of the application services, and starts-up a service program corresponding to the application service to perform access.

One embodiment of the invention is an information communication system composed of an IC card storing one or more application services and a card read/write device performing an access operation to the IC card by contactless proximity communication. It should be noted that the "system" mentioned here denotes an object composed of a plurality of devices (or functional modules each realizing a specific function) assembled logically, and whether or not the devices or the functional modules are in a single housing is particularly no object (the same applies to the below system).

The short range communication technology using the IC card has been widely popularized mainly in application services utilizing value information because it offers convenience in operations and allows high-level security communications. Further, although it has had the problem that the interface standards are different among the card venders, the problem has been solved by the short range wireless communication technology having compatibility in a plurality of physical layers of communication, such as the NFC technology.

However, it is often the case that the data structures are different among the application types implemented in the IC card, and the data structures remain unpublicized from the viewpoint of security. Therefore, it is required that the card read/write device provided with compatibility in a plurality of physical layers using the NFC technology support all of the applications provided compliant to each of the technical standards.

In contrast, in the information communication system according to an embodiment of the invention, it is arranged to store, in each of the IC cards, the service directory data describing the information of the application services stored in the card besides the unique application data. Therefore, it is possible for the card read/write device to perform service discovery, namely, to firstly read the service directory data in response to detection of the IC card coming closer thereto, and then to judge what is stored in the card, thereby confirming in advance what kind of application service the card stores. Additionally, it is possible to write the service directory data even in an existing contactless IC card in accordance with the determination of the service business entity, thus making it possible to correspond to the service discovery described above. Further, it becomes possible to perform the discovery of the existing card applications by the universal NFC compatible card read/write device.

According to an embodiment of the invention, since the IC card side stores the service directory data in the format common to all of the technology standards, the card read/write devices can commonly have the same service discovery mechanism even if each of the IC cards to be the access target has a different physical layer of communication or the data structure of the application service.

The card read/write device can be provided with the service directory process for realizing such common service discovery in a middleware layer as a module. In this case, since it is not necessary to implement a mechanism for judging the presence of the application service for every service program corresponding to the application service in the IC card side, the service discovery can be realized without bloating the software.

In the information communication system according to an embodiment of the invention, the information storage medium having the data communication function as the IC card can store one or more application services and at the same time stores the service directory data describing the attribute information of each of the application services stored therein. The attribute information of the application services described as the service directory data is composed of the information allowing identification of the data structure or the data management method of the application services, and specifically includes information regarding the technical standards regarding the application services, and names and types of the application services.

On the other hand, the information communication device operating as the card read/write device reads the service directory data from the detected information storage medium, acquires the attribute information regarding the desired one of the application services, and starts-up the service program corresponding to the application service to perform the access.

The data communication function of the information storage medium applies a given physical layer of communication such as FeliCa (Registered Trademark) of Mifare (Registered Trademark). In contrast, the information communication device compatible with the NFC can automatically detect the physical layer of communication applied in the data communication function of the detected information storage medium, and perform acquisition of the service directory data and access to the application service in accordance with a protocol of the physical layer.

Further, in some cases, the information communication device fails to acquire the service directory data from the information storage medium. In such cases, it informs the user accordingly, and stops the access to the information storage medium.

Further, when the information communication device does not support the service program corresponding to the application service discriminated from the service directory data read from the information storage medium, it informs the user accordingly and stops the access to the information storage medium.

Further according to another embodiment of the invention, there is provided an article of manufacture described in a computer-readable form so as to execute a process, on a computer system, for exchanging data with an information storage medium, which has a data communication function, is capable of storing one or more application services, and stores service directory data describing attribute information for each of the stored application services, including instructions for making the computer system perform the step of reading the service directory data from the detected information storage medium, and the step of acquiring attribute information regarding a desired one of the application services from the service directory data and starting up a service program corresponding to the application service to perform access.

The computer program according to this embodiment of the invention defines the computer program described in a computer-readable form so as to realize a predetermined process on a computer system. In other words, by installing the computer program according to this embodiment in the computer system, a corresponding action is exerted on the computer system, and the computer system can operate as an information communication device corresponding to the card read/write device in the information communication system according to the above embodiment of the invention.

According to the above embodiments of the invention, it is possible to provide a superior information communication system, information communication device, information communication method, and computer program capable of preferably communicating data with a device provided with a data communication function such as an IC card.

Further, according to the above embodiments of the invention, it is also possible to provide a superior information communication system, information communication device, information communication method, and computer program capable of preferably communicating data with a device provided with a plurality of data communication functions having technical standards different from each other.

Further, according to the above embodiment of the invention, it is also possible to provide a superior information processing device, information processing method, and computer program capable of utilizing application services with various data structures stored in an IC card in an environment in which contactless IC cards of a plurality of standards different in the physical layers of communication from each other coexist.

Other objects, features, and advantages of the invention will become apparent from the embodiments of the invention described below and further detailed explanations with reference to the accompanying drawings.

BRIEF DESCRIPTION OF THE DRAWINGS

FIG. 3 is a diagram schematically showing the hardware configuration of a card read/write device compatible with an NFC technology.

FIG. 4 is a diagram showing a configuration example of a demodulation section 203.

FIG. 5 is a diagram showing a configuration example of a modulation section 209.

FIG. 6 is a diagram showing a description example of service directory data.

DESCRIPTION OF THE EMBODIMENTS

Hereinafter, embodiments of the invention will be explained in detail with reference to the accompanying drawings.

Figure 1:
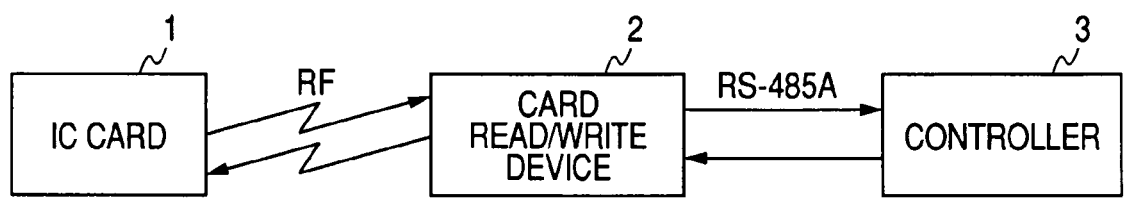
FIG. 1 is a diagram schematically showing the configuration of a contactless and proximity communication system according to an embodiment of the invention.

FIG. 1 schematically shows the configuration of a contactless and proximity communication system according to an embodiment of the invention. The system shown in the drawings is composed of an IC card 1, a card read/write device 2, and a controller 3. When entering a radio frequency (RF) field (a magnetic field) caused by an electromagnetic wave generated by the card read/write device 2, the IC card 1 is driven by power obtained by electromagnetic induction, and it can exchange data with the card read/write device 2. In this case, the card read/write device 2 transmits a predetermined command to the IC card 1, and the IC card 1 then performs a process corresponding to the received command. Then, the IC card 1 transmits response data corresponding to the processing result to the card read/write device 2.

As a specific example of the proximity communication system mentioned here, although the physical layers of the communication such as FeliCa (Registered Trademark), and the type A and type B of the contactless IC card compliant to the ISO/IEC 14443 are assumed, it is obvious that other physical layers based on the electromagnetic induction method, or proximity communication technology of a capacitive coupling method or a electromagnetic wave communication method can also be applied.

The card read/write device 2 is connected to the controller 3 via a predetermined interface (e.g., those compliant to RS-485A standard). The controller 3 supplies the card read/write device 2 with control signals to make the card read/write device 2 perform a predetermined process to the IC card 1.

Further, the IC card 1 is a contactless IC card housing a wireless communication section, and an IC chip having a data transmitting/receiving function and a data processing section, a contact-type IC card provided with terminals on the surface, or a device obtained by providing an IC chip having the same functions as the contact/contactless IC card in an information communication terminal device such as a cellular phone, a personal handyphone system (PHS), or a personal digital assistance (PDA). It should be noted that it is possible to configure an IC chip provided with the contactless IC card function with a single chip including an RF analog front-end and a logic circuit (protocol control, RF modem, command processing, encryption processing, and memory management), or with two or more IC chips separately including these circuits. In the present specification, these are simply denoted as "an IC card" as a collective term.

Figure 2:
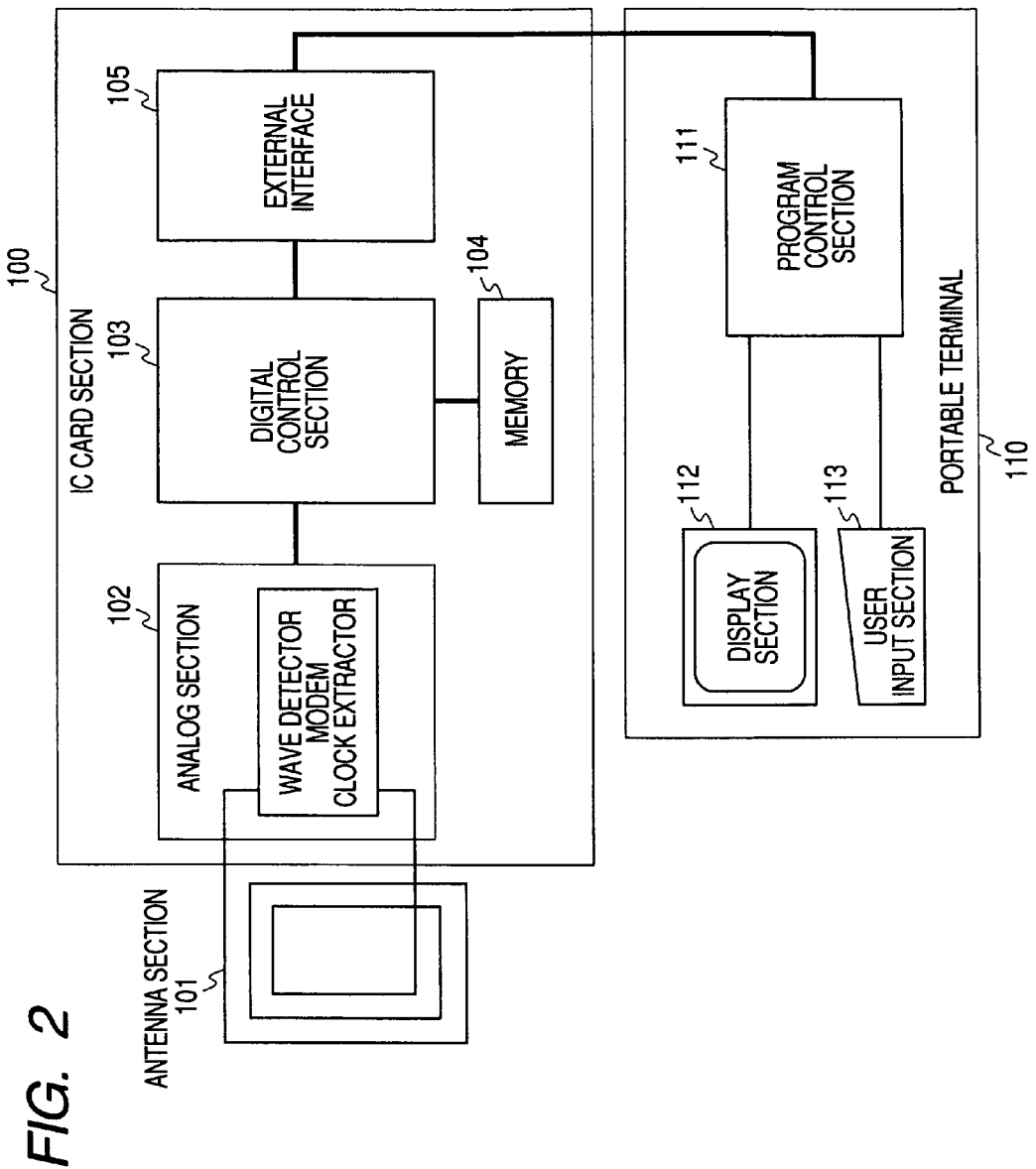
FIG. 2 is a diagram schematically showing the hardware configuration of an IC card.

FIG. 2 schematically shows the hardware configuration of the IC card. As shown in the drawing, an IC card section 100 is composed of an analog section 102 connected to the antenna section 101, a digital control section 103, a memory 104, and an external interface 105, and is housed by a portable terminal 110. The IC card section 100 can be composed of a single chip semiconductor integrated circuit or two chips of semiconductor integrated circuits separating the RF analog front-end from the logic circuit section.

The antenna section 101 performs transmission and reception of data with the card read/write device (not shown) in a contactless manner. The analog section 102 performs processing of an analog signal transmitted or received to or from the antenna section 101 such as wave detection, modulation/demodulation, or clock extraction. These elements form a contactless interface between the IC card section 100 and the card read/write device 2.

The digital control section 103 controls processing of the transmission/reception data or other operations in the IC card section 100 as a whole. Further, the digital control section 103 has an addressable memory 104 connected thereto as a local memory, and controls the memory access operation.

The memory 104 is composed of, for example, a memory device allowing electrically erasing and rewriting operations, such as an electrically erasable and programmable ROM (EEPROM), and is used for storing value information, such as electronic money or an electronic ticket and other user data, namely, an application service. The memory 104 has a relatively large capacity, and is capable of simultaneously storing a plurality of application services provided by one or more of service providing business entities. In this case, it is possible to make a single IC card apply to various applications. In general, each of the applications has a data structure unique to every service business entity, and the data structure often remains unpublicized from the viewpoint of security.

The external interface 105 is a functional module for connecting the digital control section 103 to a device such as the portable terminal 110 with an interface protocol different from that of the contactless interface for connecting to the card read/write device 2. The data written to the memory 104 can be transferred to the portable terminal 110 through the external interface 105.

Here, when performing communication with the card read/write device 2, the IC card section 100 transmits the data received from the card read/write device 2 to the portable terminal 110 directly, after converting the data with an appropriate conversion rule, or after converting the data into another packet structure, via the external interface 105. Further, on the contrary, it transmits the data received from the portable terminal 110 via the external interface 105 to the card read/write device directly, after converting the data with the appropriate conversion rule, or after converting the data into the other packet structure, via the contactless interface.

In the present embodiment, it is assumed that the IC card section 100 is used while housed in the portable terminal 110 as an information processing terminal, and a wired interface such as the universal asynchronous receiver transmitter (UART) is used as the external interface 105.

The IC card section 100 can be driven by, for example, an electromagnetic wave received from the card read/write device 2 via the antenna 101. Obviously, it can be configured so that apart or the whole thereof operates by the power supplied from the portable terminal 110 side via the wired interface 105.

The portable terminal 110 corresponds to an information processing terminal such as a cellular phone, a PDA, or a personal computer (PC). The portable terminal 110 is composed of a program control section 111, a display section 112, and a user input section 113.

The program control section 111 is composed of, for example, a microprocessor, a RAM, and a ROM (none are shown in FIG. 2), and the microprocessor performs various processing services in accordance with program codes stored in the ROM using the RAM as a working area. The processing services includes a process on the IC card section 100 besides the original function of the portable terminal 110 such as a cellular phone. It is obvious that the program control section 111 can be provided with an external storage device such as a hard disk drive or other peripheral devices.

It is assumed that the card read/write device according to the present embodiment is compatible with the NFC technology, and is compatible with a plurality of physical layers of communication, such as a contactless IC card system "FeliCa" (Registered Trademark) that is proposed by Sony Corporation or the system "Mifare" (Registered Trademark) that is proposed by Philips and is getting popularized in Europe and the United States. The card read/write device compatible with the NFC technology will hereinafter be referred to also as "an NFC communication device."

The NFC communication device has two communication modes, a passive mode and an active mode. In the passive mode, data are transmitted by performing load modulation on the electromagnetic wave (a carrier wave therefor) generated by a communication partner. In the active mode on the other side, data are transmitted by modulating the electromagnetic wave (a carrier wave therefor) generated by itself. It should be noted that, in the proximity communication using the electromagnetic induction, a device which initiates communication (namely seizes the initiative) by firstly outputting an electromagnetic wave is called "an initiator," and a communication partner which returns a response to a command from the initiator is called "a target."

FIG. 3 schematically shows the hardware configuration of a card read/write device 2 compatible with an NFC technology.

An antenna 201 forms a closed loop coil, and outputs an electromagnetic wave by varying a current flowing through the coil. Further, a current flows through the antenna 201 in response to variations in the magnetic flux passing through the coil as the antenna 201.

A receiving section 202 receives the current flowing through the antenna 201, and performs tuning and wave detection to output the result to a demodulation section 203. The demodulation section 203 demodulates the signal supplied from the receiving section 202 to supply it to a decoding section 204. The decoding section 204 decodes the encoded signal supplied from the demodulation section 203 to supply it to a data processing section 205.

The data processing section 205 performs a predetermined data process on the decoded data supplied from the decoding section 204. Further, the data processing section 205 supplies the encoding section 206 with data to be transmitted to another device.

The encoding section 206 encodes the transmit data supplied from the data processing section 205 and supplies the data it to a selection section 207. The selection section 207 selectively outputs the signal supplied from the encoding section 206 to either the modulation section 209 or the load modulation section 210.

The selection section 207 selects either the modulation section 209 or the load modulation section 210 in accordance with the control by a control section 211. The control section 211 makes the selection section 207 select the load modulation section 210 if the communication mode is the passive mode and the NFC communication device 2 acts as the target, or makes the selection section 207 select the modulation section 209 if the communication mode is the active mode, or the communication mode is passive mode and the NFC communication device 2 acts as the initiator. Accordingly, the signal output by the encoding section 206 is supplied to the load modulation section 210 via the selection section 207 in the case in which the communication mode is passive mode and the NFC communication device 2 acts as the target, but in other cases, it is supplied to the modulation section 209 via the selection section 207.

An electromagnetic wave output section 208 supplies current for emitting a carrier wave (an electromagnet wave based thereon) with a predetermined single frequency from the antenna 201. The modulation section 209 modulates the carrier wave as the current to be applied to the antenna 201 by the electromagnetic wave output section 208 in accordance with the signal supplied from the selection section 207. Thus, the electromagnetic wave obtained by modulating the carrier wave in accordance with the data output to the encoding section 206 by the data processing section 205 is emitted from the antenna 201.

The load modulation section 210 varies the impedance of the coil as the antenna 201 viewed from the outside in accordance with the signal supplied from the selection section 207. If the communication partner outputs the electromagnetic wave as the carrier wave to create an RF field (a magnetic field) around the antenna 201, the data output by the data processing section 205 to the encoding section 206 is transmitted to the communication partner by modulating the carrier wave from the communication partner in accordance with the signal supplied from the selection section 207 using the mechanism that the RF field around the antenna 201 is varied in accordance with the variation of the impedance of the antenna 201.

Although an amplitude modulation method (amplitude shift keying (ASK)), for example, can be adopted as the modulation method in the modulation section 209 and the load modulation section 210, the scope of the invention is not limited thereto, but phase shift keying (PSK), quadrature amplitude modulation (QAM), or other modulation method can also be adopted. Further, the modulation depth is not also limited to values such as 8% through 30%, 50%, or 100%.

The control section 211 controls each of the blocks composing the NFC communication device 2. A power supply section 212 supplies each of the blocks composing the NFC communication device 2 with the necessary power. It should be noted that a control line from the control section 211 to each of the blocks and a power supply line from the power supply section 212 to each of the blocks are omitted in FIG. 3 in order to prevent the drawing from being intricate.

The encoding section 206 and the decoding section 204 can process the Manchester encoding method, for example, and is also capable of selecting one of a number of types such as the modified mirror adopted in the type A or the NRZ adopted in type B for processing.

FIG. 4 shows a configuration example of the demodulation section 203. The demodulation section 203 shown in the drawing is composed of a selection section 231, N (two or more) pieces of demodulation sections $232_1$ through $232_N$, and a selection section 233.

The selection section 231 selects one demodulation section $232_n$ (n=1, 2, . . . , N) out of the N pieces of demodulation sections $232_1$ through $232_N$, and supplies the selected demodulation section $232_n$ with a signal output by the receiving section 202 in accordance with the control by the control section 211.

The demodulation section $232_n$ then demodulate the signal transmitted with an nth transmission rate to supply it to the selection section 233. In this case, since the demodulation section $232_n$ and the demodulation section $232_{n'}$ (n≠n') demodulate signals transmitted with transmission rates different from each other, the demodulation section 203 can demodulate signals transmitted with N, namely a first through Nth different transmission rates, respectively. It should be noted that transmission rates such as 106 kbps, 212 kbps, 424 kbps, or 848 kbps can be adopted as the N transmission rates. In other words, the N transmission rates include, for example, the transmission rates already adopted in the proximity communication such as an existing IC card system and other transmission rates.

The selection section 233 selects one demodulation section $232_n$ out of the N demodulation sections $232_1$ through $232_N$ and supplies the decoding section 204 with the demodulation output obtained in the demodulation section $232_n$ in accordance with the control by the control section 211.

The control section 211 makes the selection section 231 sequentially select the N demodulation sections $232_1$ through $232_N$, thus making the N demodulation sections $232_1$ through $232_N$ demodulate the signal supplied from the receiving section 202 via the selection section 231. Then, the control section 211 identifies the demodulation section $232_n$, which could normally demodulate the signal supplied from the receiving section 202 via the selection section 231, and controls the selection section 233 so as to select the output of the demodulation section $232_n$. The selection section 233 then selects the demodulation section 232n in accordance with the control by the control section 211, and thus the normal demodulation output obtained in the demodulation section 232n is supplied to the decoding section 204.

Accordingly, the demodulation section 203 can demodulate the signal transmitted with any one of the N transmission rates.

It should be noted that the demodulation sections $232_1$ through $232_N$ output the demodulation output only when the demodulation is successful, or become high impedance states without any outputs when the demodulation could not normally be performed. In this case, it is sufficient for the selection section 233 only to make the logical sum of all of the outputs of the demodulation sections $232_1$ through $232_N$ to output it to the decoding section 204.

FIG. 5 shows a configuration example of the modulation section 209. The modulation section 209 is composed of a selection section 241, N pieces of modulation sections $242_1$ through $242_N$, and a selection section 243.

The selection section 241 selects one modulation section $242_n$ (n=1, 2, . . . , N) out of the N pieces of modulation sections $242_1$ through $242_N$, and supplies the selected modulation section $242_n$ with a signal output by the selection section 207 in accordance with the control by the control section 211.

The modulation section $242_n$ modulates, via the selection section 243, the current (the carrier wave) flowing through the antenna 201 in accordance with the signal supplied from the selection section 241, thereby performing transmission of data with an nth transmission rate. In this case, since the modulation section $242_n$ and the demodulation section $232_{n'}$ (n≠n') modulate the carrier wave with transmission rates different from each other, the modulation section 209 can transmit the data with N, namely, a first through Nth different transmission rates, respectively. It should be noted that the same transmission rates as those the demodulation section 203 can demodulate with, for example, can be adopted as the N transmission rates.

The selection section 243 selects the same modulation section $242_n$ as the one selected by the selection section 241 from the N modulation sections $242_1$ through $242_N$ and electrically connects the modulation section $242_n$ to the antenna 201 in accordance with the control by the control section 211.

The control section 211 makes the selection section 241 sequentially select the N modulation sections $242_1$ through $242_N$, for example, thus making it modulate, via the selection section 243, the current (the carrier wave) flowing through the antenna 201 in accordance with the signal supplied form the selection section 241. Therefore, it is possible to modulate the carrier wave by the modulation section 209 to transmit data with a desired transmission rate out of the N transmission rates.

It should be noted that the load modulation section 210 can be configured similarly to the modulation section 209 shown in FIG. 5, and accordingly, the descriptions therefor will be omitted here.

As described above, the NFC communication device can modulate the carrier wave into the signal of the data transmitted with either one of the N transmission rates, and demodulate the signal of the data transmitted with any one of the N transmission rates. The N transmission rates mentioned here can include the transmission rates adopted in the existing IC card systems, such as FeliCa (Registered Trademark), and other transmission rates, and according to the NFC communication device, the data transaction can be performed with any one of the N transmission rates. In other words, it has compatibility with a plurality of physical layers of communication.

As described above, although the short range communication technology applying the IC card has the problem that the interface standards varies among the card venders, the problem is solved by the short range wireless communication technology having compatibility in a plurality of physical layers of communication such as the NFC technology.

However, it is often the case in which the data structures are different among the application types implemented in the IC card, and the data structures remain unpublicized from the viewpoint of security. Therefore, it is required that the card read/write device provided with compatibility in a plurality of physical layers using the NFC technology support all of the applications provided compliant to each of the technical standards.

Therefore, in the proximity communication system according to the present embodiment, it is arranged that the service directory data is stored in the side of the IC card with a format common to all of the technical standards. Accordingly, the card read/write devices can commonly have the same service discovery mechanisms even if the IC cards that are to be the access targets have different physical layers of communication or different data structures of the application services.

The service directory data can be described using a structured description language, such as the extensible markup language (XML). FIG. 6 shows a descriptive example of the service directory data. In the example shown in the drawing, the document structure is defined so as to describe the type, the application name, and the used physical layer of each of the application services inside <Service> tag and </Service> tag. It is assumed that no matter what description format is adopted, the format of the service directory data is common to all of the technical standards.

The service directory data needs to be disposed in a memory space formed on the memory 104 at an area, which can be browsed by the card read/write device upon detection of the IC card. For example, in the case in which the memory space has a flat structure, it is possible to write the service directory data in the start address known to both the IC card and the card read/write device (see, for example, FIG. 7). Further, in the case in which the memory space has a structure divided into areas each assigned to an application service or a service business entity, it is possible to provide an area dedicated to the service directory, in which the service directory data is stored (see, for example, FIG. 8).

Figure 9:
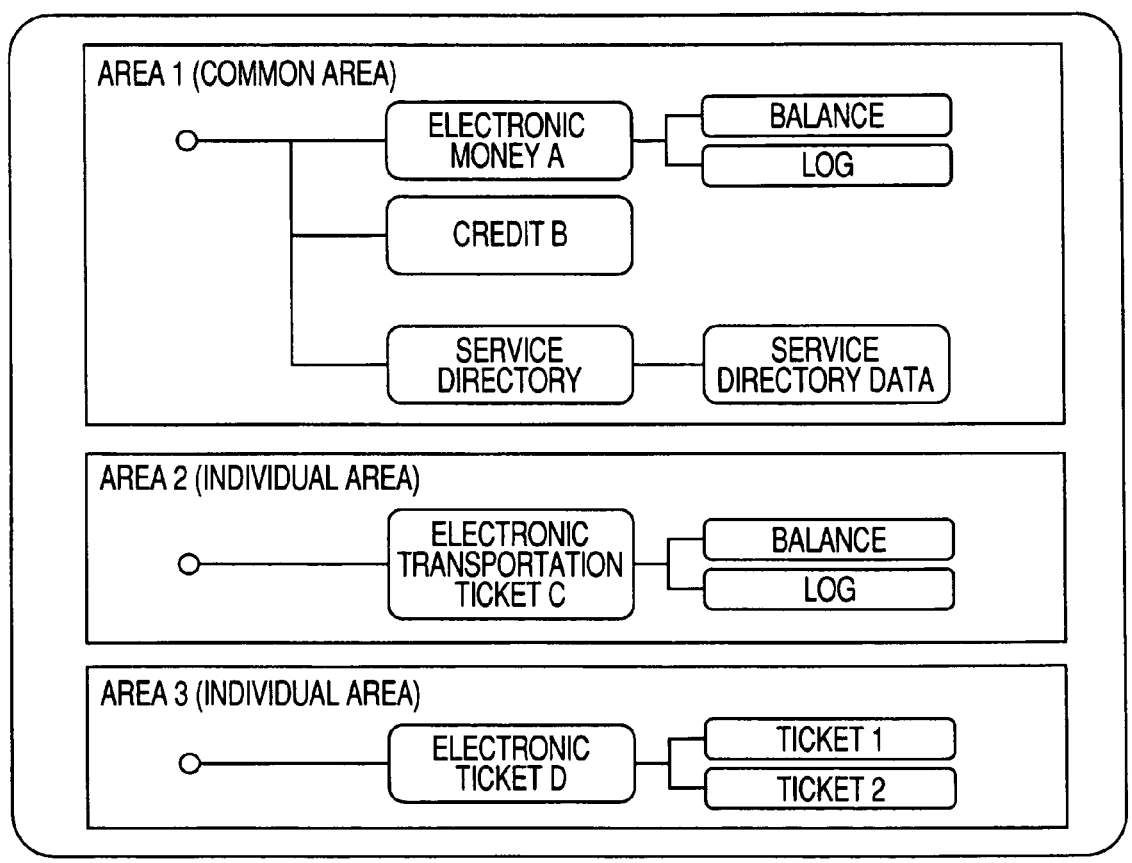
FIG. 9 is a diagram showing an example of assigning the service directory data in a memory space in the IC card.

Further, in the case in which the memory space is composed of "a common area" for using the application services authorized by an IC card management business entity and a ready-made "free area" other than the common area (in this case, a plurality of "individual areas" can be created by dividing the area for every service business entity using the free area), it is possible to provide the service directory in the common area similarly to other authorized application services, and to store the service directory data under the service directory (see, for example, FIG. 9).

Additionally, it is possible to write the service directory data even in an existing contactless IC card in accordance with the determination of the service business entity.

It is possible for the card read/write device to perform service discovery, namely to firstly read the service directory data in response to detection of the IC card coming closer thereto, and then judge what is stored in the card, thereby confirming in advance what kind of application service the card stores.

Figure 7:
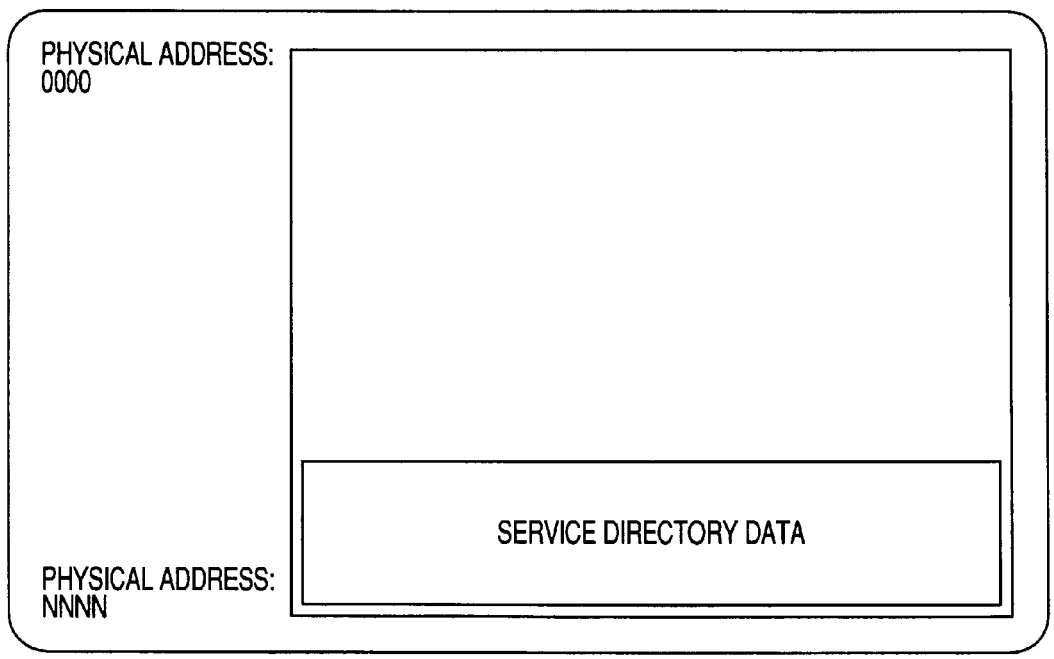
FIG. 7 is a diagram showing an example of assigning the service directory data in a memory space in the IC card.
Figure 8:
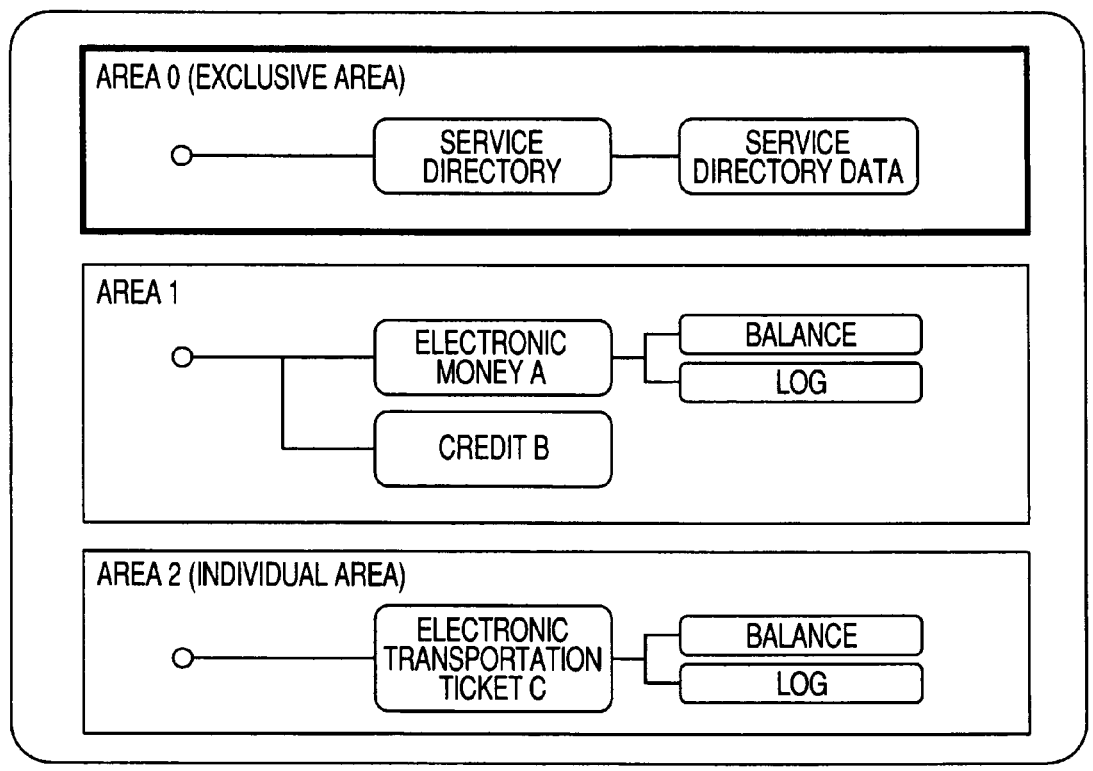
FIG. 8 is a diagram showing an example of assigning the service directory data in a memory space in the IC card.

Further, since the IC card side stores the service directory data in the format common to all of the technology standards as shown in FIGS. 7 through 9, the card read/write devices can commonly have the same service discovery mechanism even if each of the IC cards that are to be the access targets has a different physical layer of communication or the data structure of the application service.

The card read/write device can be provided with the service directory process for realizing such common service discovery in a middleware layer as a module. In this case, since it is not necessary to implement a mechanism for judging the presence of the application service for every service program corresponding to the application service in the IC card side, the service discovery can be realized without bloating the software. Further, when the application service in the IC card is identified by the service discovery, the application in the IC card can be used in the card read/write device side by starting up the service program.

Figure 10:
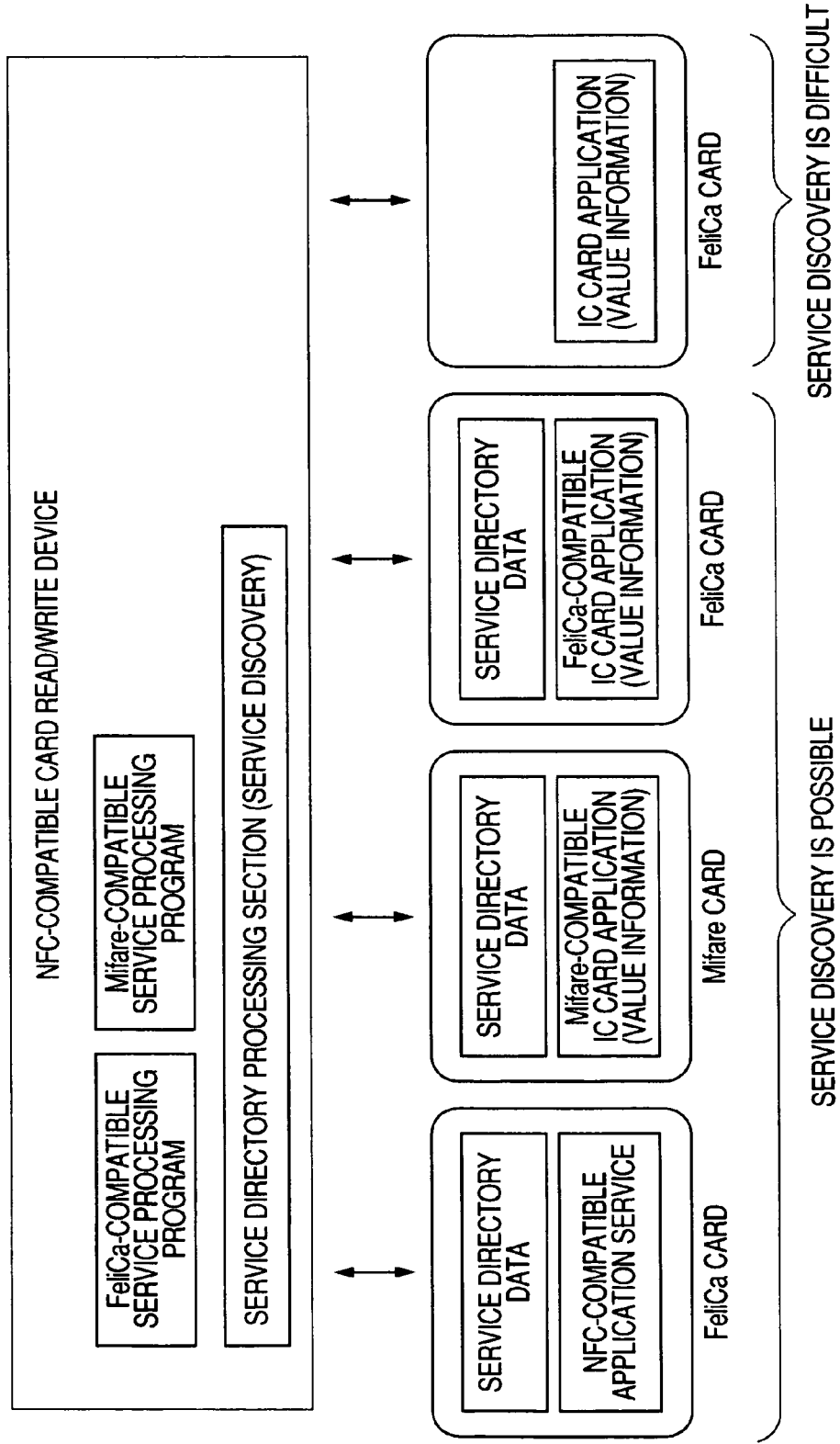
FIG. 10 is a diagram for explaining a mechanism with which a card read/write device realizes service discovery.

FIG. 10 illustrates the mechanism with which the card read/write device realizes service discovery.

There are IC cards with different physical layers of communication such as FeliCa (Registered Trademark) or Mifare (Registered Trademark) mixed with each other in the world. Each of the IC cards stores therein an application service regarding the value information such as electronic money or an electronic ticket, such as Suica (Registered Trademark), Edy (Registered Trademark), or E-plus (Registered Trademark). These application services take data management systems corresponding to already existing individual technical standards such as FeliCa (Registered Trademark) or Mifare (Registered Trademark), or a data management system corresponding to the NFC.

Many IC cards store the service directory data in the forms shown in FIGS. 7 through 9 together with the application services. It should be noted that the existing IC cards do not store the service directory data because of the determination of the service business entity or other reasons.

The card read/write device is provided with a service directory processing section for realizing the processing operation regarding the service discovery and a service processing program corresponding to each of the application services.

Since it becomes unnecessary to implement a mechanism for making a judgment of the existence of the application service for every service program by implementing the service directory processing section in the middleware layer, the service discovery can be realized without bloating the software.

The card read/write device forms the RF field by generating the electromagnetic wave from the antenna 201. Further, in response to the detection of the IC card entering the field, the service directory processing section is started up to firstly read the service directory data and then to judge what is stored in the card, thereby confirming in advance what application service the card stores. Then, the corresponding service program is started up to allow the execution of an access (e.g., accounting or balance inquiry to electronic money, or writing or browsing of logs) to the application service.

Figure 11:
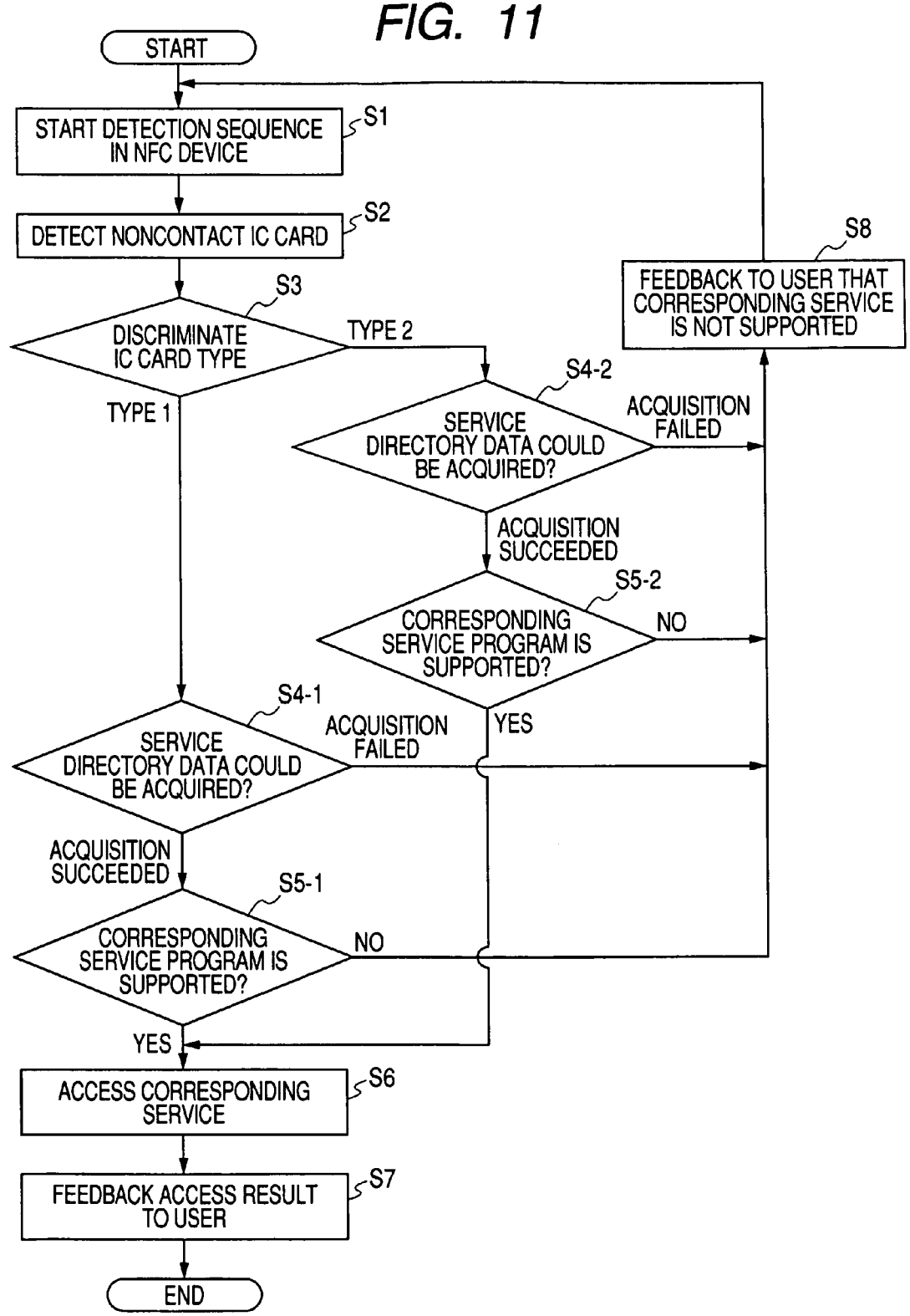
FIG. 11 is a flowchart showing a process procedure with which the card read/write device realizes service discovery.

FIG. 11 shows a process procedure with which the card read/write device realizes the service discovery in the form of a flowchart.

The card read/write device forms the RF field by generating the electromagnetic wave from the antenna 201 to start an IC card detection sequence (step S1).

Here, if the IC card enters the RF field, the IC card can be detected in the physical layer of communication (step S2), and the card type, namely, the physical layer of communication adopted by the IC card, is detected (step S3). The card read/write device as the NFC communication device can correspond to a plurality of physical layers of communication and perform succeeding communication operations in accordance with the physical layer protocol detected in this step. In the example shown in the drawing, for the sake of convenience of explanations, it is assumed that there are two types of cards.

Subsequently, the service directory processing section in the middleware layer is started up to try to acquire the service directory data by a communication operation in accordance with the card type (step S4).

Here, if the service directory data cannot be acquired because no service directory data is stored in the IC card, or for other reasons (NO in step S4), the card read/write device feeds back that the present service is not supported to the user, and returns to the IC card detection sequence (step S1).

Further, if the service directory processing section has successfully acquired the service directory data from the IC card, the service directory processing section decodes the service directory data to identify the application service stored in the IC card and confirms whether or not the corresponding service program is implemented in the card read/write device (step S5).

Here, if the card read/write device does not support the corresponding service program (NO in step S5), the card read/write device feeds back that it does not support the present service to the user, and returns to the IC card detection sequence (step S1).

On the other hand, if the card read/write device supports the corresponding service program (YES in step S5), the card read/write device accesses the application service in the IC card using the service program (step S6) to perform, for example, accounting or balance inquiring to electronic money or writing or browsing of logs.

Then, the result of the access to the application service is fed back to the user (step S7), and the whole of the process routine is terminated.

As described above, the invention is described in detail with reference to the specific embodiment. However, it is obvious that those skilled in the art can perform modifications and alterations of the above embodiment within the scope of the invention.

Although in the present specification, the descriptions are provided focusing on the embodiment applying the invention to the system composed of the IC card and the card read/write device performing the transaction of data by contactless and proximity communication, the scope of the invention is not necessarily limited thereto. For example, the invention can be applied similarly to a proximity communication system other than the IC card and the card read/write device or an information communication system composed of devices which do not use the proximity communication.

In conclusion, the invention is disclosed above as a form of an exemplification, and accordingly, the descriptions in the present specification should not be interpreted in a restrictive manner. The appended claims should be referred to in order for determining the scope of the invention.

It should be understood by those skilled in the art that various modifications, combinations, subcombinations and alternations may occur depending on design requirements and other factors insofar as they are within the scope of the appended claims or the equivalents thereof.

What is claimed is:

1. An information communication system comprising:
an information storage medium having a data communication function determined by a physical communication layer, and
an information communication device for accessing the information storage medium by determining the physical communication layer of the information storage medium, from among a plurality of potential physical communication layers, and accessing the information storage medium in accordance with a protocol associated with the determined physical communication layer,
wherein the information communication device reads attribute information for at least one stored application service from the information storage medium and acquires the attribute information to confirm if the at least one stored application service can be used by the information communication device.

2. An information communication device, comprising:
means for performing communication with an information storage medium having a data communication function determined by a physical communication layer;
means for accessing the information storage medium by determining the physical communication layer of the information storage medium, from among a plurality of potential physical communication layers, and accessing the information storage medium in accordance with a protocol associated with the determined physical communication layer;
means for reading attribute information for at least one stored application service from the information storage medium; and
means for acquiring the attribute information to confirm if the at least one stored application service can be used by the information communication device.

3. An information communication device, comprising:
a communication unit configured to perform communication with an information storage medium having a data communication function determined by a physical communication layer;
a service access unit configured to access the information storage medium by determining the physical communication layer of the information storage medium, from among a plurality of potential physical communication layers, and access the information storage medium in accordance with a protocol associated with the determined physical communication layer;
wherein attribute information for at least one stored application service is read from the information storage medium, and the attribute information is acquired to confirm if the at least one stored application service can be used the information communication device.

4. An information communication method, comprising:
performing communication with an information storage medium having a data communication function determined by a physical communication layer;
accessing the information storage medium by determining the physical communication layer of the information storage medium, from among a plurality of potential physical communication layers, and accessing the information storage medium in accordance with a protocol associated with the determined physical communication layer;
reading attribute information for at least one stored application service from the information storage medium; and
acquiring the attribute information to confirm if the at least one stored application service can be used by the information communication device.

5. A non-transitory computer readable medium having program code stored thereon, the program code being executable by a processor to perform operations comprising:
performing communication with an information storage medium having a data communication function determined by a physical communication layer;
accessing the information storage medium by determining the physical communication layer of the information storage medium, from among a plurality of potential physical communication layers, and accessing the information storage medium in accordance with a protocol associated with the determined physical communication layer;
reading attribute information for at least one stored application service from the information storage medium; and
acquiring the attribute information to confirm if the at least one stored application service can be used by the information communication device.

* * * * *